United States Patent
Amei

(10) Patent No.: US 9,906,141 B2
(45) Date of Patent: Feb. 27, 2018

(54) DC-DC CONVERTER

(71) Applicant: SMK Corporation, Tokyo (JP)

(72) Inventor: Toshihiro Amei, Tokyo (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 15/219,305

(22) Filed: Jul. 26, 2016

(65) Prior Publication Data

US 2016/0336863 A1 Nov. 17, 2016

Related U.S. Application Data

(63) Continuation of application No. PCT/JP2014/076478, filed on Sep. 26, 2014.

(30) Foreign Application Priority Data

Jul. 25, 2014 (JP) ................................. 2014-151351

(51) Int. Cl.
*H02M 1/32* (2007.01)
*H02M 3/335* (2006.01)
*H02M 1/08* (2006.01)
*H02H 7/12* (2006.01)

(52) U.S. Cl.
CPC ...... *H02M 3/33507* (2013.01); *H02H 7/1213* (2013.01); *H02M 1/08* (2013.01); *H02M 1/32* (2013.01)

(58) Field of Classification Search
CPC .......... H02M 1/08; H02M 1/088; H02M 1/32; H02M 1/36; H02M 3/335; H02M 3/33507
See application file for complete search history.

(56) References Cited

U.S. PATENT DOCUMENTS 7,598,680 B2 * 10/2009 Chen ....................... H02J 7/022
                                                               315/291
2012/0044724 A1 * 2/2012 Morota ............. H02M 3/33523
                                                               363/21.17

(Continued)

FOREIGN PATENT DOCUMENTS

JP    H5-111254 A    4/1993
JP    H6-284714 A    10/1994

(Continued)

OTHER PUBLICATIONS

International Search Report for International Application No. PCT/JP2014/076478, issued by the Japan Patent Office dated Dec. 16, 2014

(Continued)

*Primary Examiner* — Matthew Nguyen

(57) ABSTRACT

In a DC-DC converter, a voltage at a connection point on the side of connection with a primary winding of a switching transistor is compared to a threshold voltage set within a variation range of the voltage at the connection point while the switching transistor is performing a switching operation, and, when the polarity by which the voltage was compared to the threshold voltage does not change during a detection period longer than the predetermined period of the drive signal for bringing the switching transistor under switching control, the switching transistor is determined as being operating in an active state with a danger of heat generation.

3 Claims, 4 Drawing Sheets

(56) References Cited

U.S. PATENT DOCUMENTS

| | | | | |
|---|---|---|---|---|
| 2012/0161736 A1* | 6/2012 | Heo | ................ | H02M 1/36 |
| | | | | 323/284 |
| 2013/0278069 A1* | 10/2013 | Amei | ................ | G05F 1/462 |
| | | | | 307/103 |
| 2015/0102672 A1* | 4/2015 | Matsumoto | ........... | H02M 1/08 |
| | | | | 307/31 |

FOREIGN PATENT DOCUMENTS

| JP | 2011-244659 A | 12/2011 |
|---|---|---|
| JP | 2012-135149 A | 7/2012 |
| JP | 2013-255304 A | 12/2013 |

OTHER PUBLICATIONS

Office Action issued for counterpart Japanese Application 2014-151351, issued by the Japan Patent Office dated Apr. 1, 2015.

\* cited by examiner

DC-DC CONVERTER

CROSS REFERENCE TO RELATED APPLICATION

The contents of the following Japanese patent application and International patent application are incorporated herein by reference, Japanese Patent Application No. 2014-151351 filed on Jul. 25, 2014, and International Patent Application No. PCT/JP2014/76478 filed on Sep. 26, 2014.

FIELD

The present invention relates to a DC-DC converter that converts a direct-current voltage to a stable direct-current voltage suited to a load, more specifically, to an isolated DC-DC converter that discontinues a current flowing to a primary winding of a transformer by opening or closing a switching transistor, converts a direct-current input voltage on the primary side of the transformer to a different direct-current output voltage, and outputs the same from the secondary side of the transformer.

BACKGROUND

The DC-DC converters are intended to convert a direct-current input voltage to a different direct-current output voltage and output the same to a load. The DC-DC converters are included in individual electronic circuits operating at different direct-current voltages in various electric products such as notebook personal computers to convert input voltages to stable direct-current voltages necessary for the electronic circuits and output the same. The DC-DC converters are divided by their operating principles into a non-insulated type that discontinues a current flowing into an inductor by a switching transistor and converts a direct-current input voltage to a direct-current output voltage different in voltage or polarity and an insulated type that increases or decreases an input voltage by a transformer. As a converter that converts a direct-current input voltage to an output voltage with a large potential difference from the direct-current input voltage, the insulated DC-DC converters are employed for battery chargers and AC adapters of portable electronic devices such as mobile phones and mobile music players.

FIG. 4 illustrates a flyback converter 100 as an example of the typical insulated DC-DC converters. In FIG. 4, reference sign 10a indicates a high-voltage terminal of a direct-current power supply 1, 10b a low-voltage terminal of the direct-current power supply 1, 11a a primary winding of a transformer 11, and 11b a secondary output winding of the transformer 11. A switching transistor Tr1 is connected in series with the primary winding 11a of the transformer 11 relative to the direct-current power supply 10, is composed of an FET (field-effect transistor), for example, and is controlled by a drive signal output from a drive circuit 3 to a gate of the switching transistor Tr1 to be opened or closed. While the switching transistor Tr1 is controlled to be closed (on-control) and is operating in a saturated state, an excitation current flows from the direct-current input power supply 10 to the primary winding 11a of the transformer 11. When the switching transistor Tr1 is controlled to be opened (off-control), the electric power accumulated in the transformer 11 by the excitation current flowing to the primary winding 11a during the period of the close control is released from the secondary output winding 11b.

Provided on the secondary side of the transformer 11 are a rectifying diode 15 and a smoothing capacitor 16 constituting a rectifying and smoothing circuit that rectifies and smooths an output of the secondary output winding 11b, converts an input voltage Vin of the direct-current power supply 1 to an output voltage Vo between a high-voltage output line 20a and a low-voltage output line 20b, and outputs the same to a load connected between the high-voltage output line 20a and the low-voltage output line 20b. A voltage monitoring circuit 12 is provided between the pair of output lines 20a and 20b to monitor the output voltage Vo in comparison with a voltage set according to the rating of the load. The voltage monitoring circuit 12 on the secondary side of the transformer 11 and the drive circuit 3 on the primary side of the transformer 11 constituting a constant-voltage control circuit are connected by a photo coupler light-emitting element 13 and a photo coupler light-receiving element 14 performing photo-coupling.

The voltage monitoring circuit 12 controls the light emission of the photo coupler light-emitting element 13 as far as the output voltage Vo between the high-voltage output line 20a and the low-voltage output line 20b is over the set voltage. Upon receipt of the light emitted from the photo coupler light-emitting element 13, the photo coupler light-receiving element 14 outputs to the drive circuit 3 a limit signal indicating the state in which the output voltage Vo is over the set voltage. The output voltage Vo increasing or decreasing in accordance with the electric power accumulated in the transformer 11 can be controlled by increasing or decreasing the duration of the close control of the switching transistor Tr1 within a unit time. Accordingly, the drive circuit 3 performs variable control of on-duty of the drive signal by PWM modulation or PFM modulation with the limit signal. The drive circuit 3 decreases the on-duty of the drive signal for the close control of the switching transistor Tr1 while receiving the limit signal from the photo coupler light-receiving element 14, and increases the on-duty while not receiving the limit signal.

Accordingly, when the output voltage Vo is over the set voltage, for example, the drive circuit 3 outputs the drive signal with the decreased on-duty to the gate of the switching transistor Tr1, thereby to shorten the duration of the on-control within the unit time and lower the output voltage Vo. In contrast, when the output voltage Vo is lower than the set voltage, the drive signal with the increased on-duty is output to the gate of the switching transistor Tr1 to lengthen the duration of the on-control within the unit time and raise the output voltage Vo until the set voltage is exceeded. By repeating this process, the output voltage Vo is brought under constant-voltage control and kept at the predetermined set voltage.

In general, this kind of DC-DC converter may suffer a breakage or a fire of the load circuit when being brought into an unexpected abnormal operating state such as an overload or a short circuit of an output line. Accordingly, there is a DC-DC converter provided with a protection circuit to detect a drop in the output voltage, an abnormal rise in the output current, or the like, and shut off the output lines 20a and 20b (refer to Patent Literatures 1 and 2).

In addition, there is known a DC-DC converter that includes a protection circuit in which a fuse is connected in series with the primary winding 11a of the transformer 11 to shut off the current flowing to the primary winding 11a when the current exceeds the predetermined current rating.

CITATION LIST

Patent Literature

Patent Literature 1: Japanese Patent Application Publication No. 2011-244659
Patent Literature 2: Japanese Patent Application Publication No. H6-284714

SUMMARY

Problems to be Solved

In the thus configured DC-DC converter 100, when the modulation circuit or the like of the drive circuit 3 performing the PWM modulation or PFM modulation suffers a breakdown due to a lighting stroke or the like, the DC-DC converter 100 may output the drive signal of a constant potential to the gate (base) of the switching transistor Tr1, stop the switching operation, and continue to operate in a direct-current bias state. At that time, the switching transistor Tr1 operates in an active state, and the direct-current input power supply 10 continues to flow a current decided by the resistance value of the primary winding 11a of the transformer 11 and the switching transistor Tr1 connected in series with each other.

However, the DC-DC converter that reduces a switching loss of the switching transistor Tr1 as much as possible and converts an input voltage to a direct-current output voltage with high efficiency, cannot diverge thermal energy generated by the on-resistance, unlike a power MOS on which heat radiation measure is taken or a series regulator using a power transistor. Therefore, there is a danger of a severe accident in which the switching transistor Tr1 generates heat and causes a fire.

Meanwhile, even when the switching transistor Tr1 operates in the active state, the output voltage and the output current decrease due to power consumption by the load and do not exceed determination values by which abnormal operation is determined. Accordingly, the protection circuits described in Patent Literatures 1 and 2 cannot detect the foregoing abnormal operation. Further, a large number of DC-DC converters are arranged in the housing of an electric product, and the abnormal heat generation of the switching transistor Tr1 cannot be detected from outside by visual check or feel, and there is a fear that the abnormal operation cannot be discovered until a fire actually occurs in the electric product.

Even in the DC-DC converter in which the fuse is connected in series with the primary winding 11a of the transformer 11, the current flowing when the switching transistor Tr1 is operating in the active state does not exceed the current rating of the fuse, and the fuse cannot shut off the current.

That is, although the occurrence of the phenomenon where the modulation circuit or the like of the drive circuit 3 suffers a breakdown to output continuously the drive signal by which the switching transistor Tr1 is brought into the active state is very rare, once such a breakdown occurs, the typical DC-DC converter cannot detect this but results in a fire accident at high frequency, which is an extremely serious problem.

The present invention is devised in consideration of the foregoing typical problems. An object of the present invention is to provide a DC-DC converter that detects an abnormal operation of the switching transistor Tr1 in the active state by a simple circuit configuration.

Another object of the present invention is to provide a DC-DC converter that stops input from the direct-current input power supply before the switching transistor Tr1 operating in the active state causes abnormal heat generation, thereby to prevent occurrence of a fire, without having to change the configuration of the typical DC-DC converter.

Solutions to Problems

To achieve the foregoing objects, a DC-DC converter described in a 1st aspect includes: a transformer that has a primary winding and a secondary output winding; a switching transistor that is connected in series between a low-voltage terminal of a direct-current power supply exciting the primary winding and the primary winding; a drive circuit that outputs to a control terminal of the switching transistor a drive signal for bringing the switching transistor under open or close control in a predetermined period; and a constant-voltage control circuit that controls the close time of the switching transistor by the drive signal in accordance with an output voltage between a pair of high-voltage output line and low-voltage output line on the secondary side of the transformer to bring the output voltage under constant-voltage control. The DC-DC converter includes: a comparison circuit that compares a voltage at a connection point on the side of connection with the primary winding of the switching transistor to a threshold voltage arbitrarily set within a variation range of the voltage at the connection point while the switching transistor is performing a switching operation; and an abnormality determination circuit that, when the polarity by which the comparison circuit compared the voltage to the threshold voltage does not change during a detection period longer than the predetermined period of the drive signal, determines that the switching transistor is operating in an active state.

The voltage at the connection point on the side of connection with the inductor of the switching transistor varies within the variation range while the switching transistor is repeatedly performing a normal switching operation between the saturated state and the shutoff state. The polarity by which the comparison circuit compared the voltage to the threshold voltage changes in the predetermined period during which the switching transistor opens or closes. When the switching transistor operates in the active state, the input voltage is almost uniform and the voltage at the connection point A holds an almost uniform potential. Accordingly, the polarity by which the comparison circuit compared the voltage to the threshold voltage does not change in the detection period longer than the predetermined period during which the switching transistor opens or closes. The abnormality determination circuit thus can determine the active-state operation of the switching transistor discriminating from the normal switching operation.

A DC-DC converter described in a 2nd aspect includes: a transformer that has a primary winding, a primary sub winding, and a secondary output winding; a switching transistor that is connected in series between a low-voltage terminal of a direct-current power supply exciting the primary winding and the primary winding; a drive circuit that outputs to a control terminal of the switching transistor a drive signal for bringing the switching transistor under open or close control in a predetermined period; and a constant-voltage control circuit that controls the close time of the switching transistor by the drive signal in accordance with an output voltage between a pair of high-voltage output line and low-voltage output line on the secondary side of the transformer to bring the output voltage under constant-voltage control. One end of the primary sub winding is connected to the low-voltage terminal or the high-voltage terminal of the direct-current power supply, the DC-DC converter includes: a comparison circuit that compares a voltage at the other end of the primary sub winding to a threshold voltage arbitrarily set within a variation range of the voltage while the switching transistor is performing a switching operation; and an abnormality determination circuit that, when the polarity by which the comparison circuit compared the voltage to the threshold voltage does not change during a detection period longer than the predetermined period of the drive signal, determines that the switching transistor is operating in an active state.

The voltage at the other end not connected directly to the direct-current power supply of the primary sub winding varies within the variation range while the switching transistor is repeatedly performing a normal switching operation between the saturated state and the shutoff state. The polarity by which the comparison circuit compared the voltage to the threshold voltage changes in the predetermined period during which the switching transistor opens or closes. When the switching transistor operates in the active state, the input voltage is almost uniform and the voltage at the other end of the primary sub winding holds an almost uniform potential. Accordingly, the polarity by which the comparison circuit compared the voltage to the threshold voltage does not change in the detection period longer than the predetermined period during which the switching transistor opens or closes. The abnormality determination circuit thus can determine the active-state operation of the switching transistor discriminating from the normal switching operation.

A DC-DC converter described in a 3rd aspect includes a protection circuit that, when the abnormality determination circuit determines the active-state operation of the switching transistor, brings under open control an emergency stop switch connected between the direct-current input power supply and the primary winding.

When the abnormality determination circuit determines the active-state operation of the switching transistor, the emergency stop switch is controlled and opened to stop the current flowing from the direct-current input power supply to the switching transistor, and the switching transistor no longer generates heat due to the active-state operation.

According to the 1st and 2nd aspect of the invention, even when part of the drive circuit or the switching transistor suffers a breakdown and the switching transistor operates in the active state, the active-state operation can be determined discriminating from the normal switching operation. Therefore, measures for avoidance of a fire accident can be taken before occurrence of a fire, such as informing the user of the danger of heat generation by the switching transistor and stopping the operation of the DC-DC converter.

In addition, the active-state operation of the switching transistor can be detected only by monitoring the voltage at the connection point on the side of connection with the primary winding of the switching transistor and at the other end of the primary sub winding varying due to the switching operation. By merely adding the comparison circuit and the abnormality determination circuit to the existing DC-DC converter, it is possible to detect abnormal operation that could not detected by typical protection circuits.

According to the 3rd aspect of the invention, it is possible to stop heat generation of the switching transistor before the heat generation becomes abnormal and prevent the occurrence of a fire.

DESCRIPTION OF EMBODIMENTS

Figure 1:
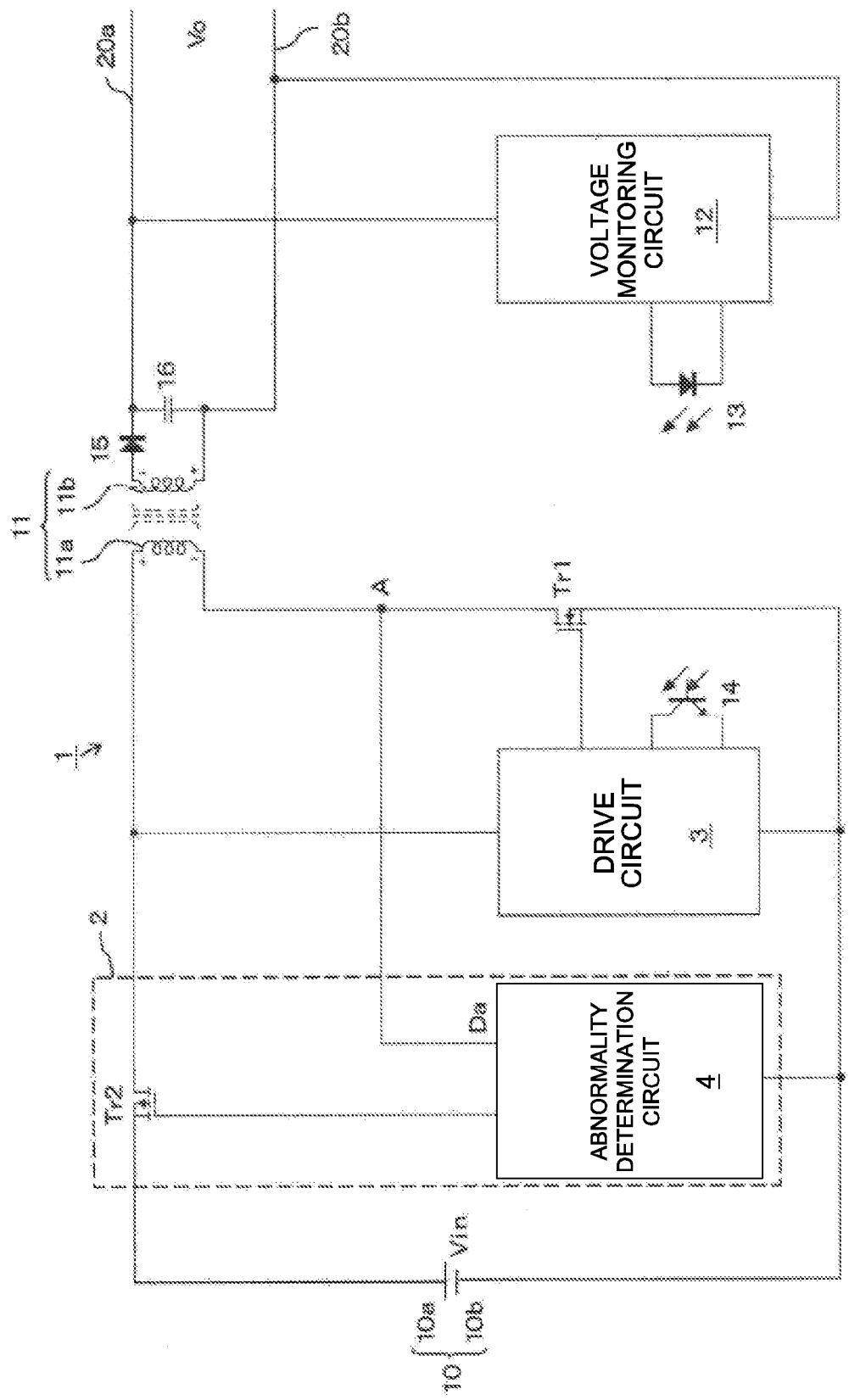
FIG. 1 is a circuit diagram of a DC-DC converter 1 according to an embodiment of the present invention.
Figure 4:
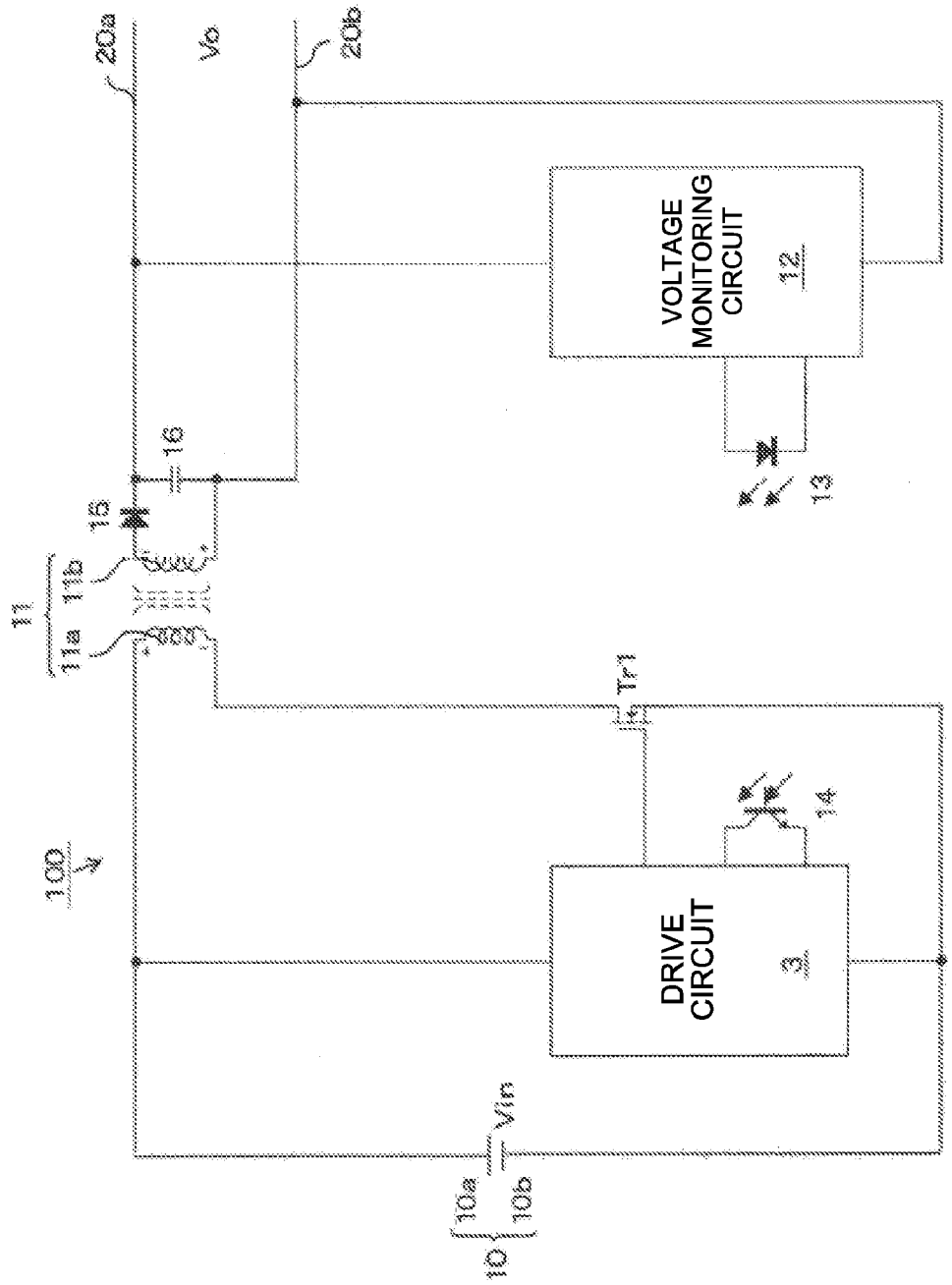
FIG. 4 is a circuit diagram of a typical insulated DC-DC converter 100.

A DC-DC converter according to an embodiment of the present invention is a flyback DC-DC converter 1 that converts a 141-V direct-current input voltage Vi to a 5-V direct-current output voltage. The DC-DC converter 1 will be described below with reference to FIGS. 1 and 2. FIG. 1 is a circuit diagram of the DC-DC buck converter 1. As is apparent from comparison with a typical DC-DC converter 100 illustrated in FIG. 4, the DC-DC converter 1 has the basic configuration of the DC-DC converter 100 but further includes a protection circuit 2 and a switching transistor Tr2 as an emergency stop switch connected between a high-voltage terminal 10a of a direct-current input power supply 10 and a switching transistor Tr1. The DC-DC converter 1 has major circuit components in common with the typical DC-DC buck converter 100, and the substantially identical or similarly operating components will be given the same numbers and detailed descriptions thereof will be omitted.

The direct-current input power supply 10 is an unstable power supply in which the direct-current input voltage Vi obtained by rectifying and smoothing a commercial alternating-current power supply of 100V varies about 10%. The switching transistor Tr2, a primary winding 11a of a transformer 11, and the switching transistor Tr1 as main switching element are connected in series between the +141-V high-voltage terminal 10a and a 0-V low-voltage terminal 10b to form a closed circuit.

The switching transistor Tr1 is an N-channel FET (field-effect transistor), and the switching transistor Tr2 is a P-channel FET. The switching transistor Tr1 has a gate connected to a drive circuit 3 constituting part of a constant-voltage control circuit, and is controlled and turned on or off by a drive signal output from the drive circuit 3. The switching transistor Tr2 has a gate connected to an output of a RS flip-flop circuit 5 described later of the protection circuit 2, and is controlled and turned on or off by an output signal from the RS flip-flop circuit 5. The on-control of the switching transistors Tr1 and Tr2 refers to controlling the switching transistors Tr1 and Tr2 in a saturated state and closing the drain to source. The off-control of the switching transistors Tr1 and Tr2 refers to controlling the switching transistors Tr1 and Tr2 in a shutdown state and opening the drain to source.

The drive signal output from the drive circuit 3 is a pulse signal that alternates repeatedly between H level and L level in a fixed period T of 800 nS, for example. While the drive circuit 3 outputs the H-level drive signal to the gate of the switching transistor Tr1, the switching transistor Tr1 is brought under the on-control and an excitation current flows from the direct-current input power supply 10 to the primary winding 11a of the transformer 11. During the on-control time, the direction of a rectifying diode 15 is opposite to the direction of an inductive current tending to flow to the secondary output winding 11b. Accordingly, the core of the transformer 11 is magnetized by the excitation current to accumulate electric energy.

Afterward, when the drive circuit 3 outputs the L-level drive signal to the gate of the switching transistor Tr1, the switching transistor Tr1 is brought under the off-control, and the electric energy accumulated in the core of the transformer 11 during the off-control time is released. Accordingly, a charging current for charging a smoothing capacitor 16 flows from the secondary output winding 11b through the rectifying diode 15, and an output voltage Vo (the charging voltage of the smoothing capacitor 16) appears between a high-voltage output line 20a and a low-voltage output line 20b of the smoothing capacitor 16.

The constant-voltage control circuit composed of a voltage monitoring circuit 12 and the drive circuit 3 controls the output voltage Vo to match with a set voltage as a load operating voltage. When the output voltage Vo is higher than the set voltage, the drive circuit 3 having received the limit signal from the photo coupler light-receiving element 14 controls and shortens the H-level time within the fixed period T of 800 nS of the drive signal by a built-in pulse width modulation circuit PWM, and the drive signal with decreased on-duty is output to the gate of the switching transistor Tr1. As a result, the on-control time within the unit time of the switching transistor Tr1 is shortened to decrease the output voltage Vo. In contrast, when the output voltage Vo is lower than the set voltage, the drive signal with increased on-duty is output to the gate of the switching transistor Tr1 to lengthen the on-control time within the unit time and raise the output voltage Vo. By repeating this control, the output voltage Vo is brought under the constant-voltage control and kept at the set voltage.

Figure 2:
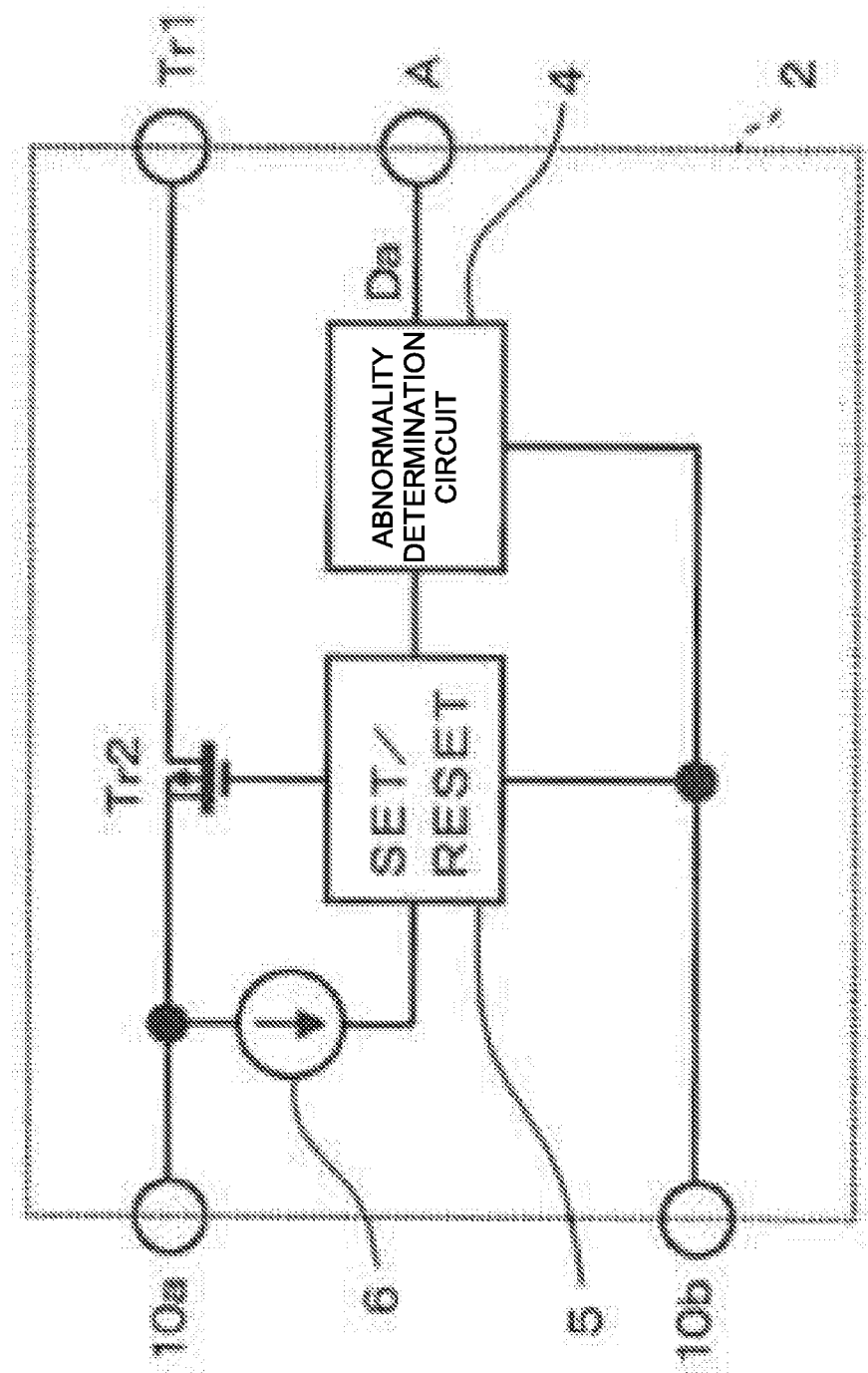
FIG. 2 is a block diagram of a protection circuit 2.

The protection circuit 2 according to the embodiment includes an abnormality determination circuit 4 that has a detection terminal Da connected to the connection point A to monitor the potential at the connection point A between the switching transistor Tr1 and the primary winding 11a of the transformer 11 and the RS flip-flop circuit 5 that is connected to the output of the abnormality determination circuit 4 as illustrated in FIGS. 1 and 2. The abnormality determination circuit 4 and the RS flip-flop circuit 5 are connected between a constant-current circuit 6 connected to the high-voltage terminal 10a and the low-voltage terminal 10b, and operate with the direct-current input power supply 10 as a power supply converted to a stable potential by the constant-current circuit 6.

The abnormality determination circuit 4 includes a comparison circuit not illustrated that compares the voltage Vd at the connection point A to a threshold voltage Vth arbitrarily set within the variation range of the voltage Vd while the switching transistor Tr1 is performing a switching operation. In the embodiment, the voltage Vd at the connection point A varies from 0 V of the input voltage Vi to +141 V plus a voltage appearing depending on the winding ratio between the primary winding 11a and the secondary output winding 11b. Therefore, the threshold voltage Vth is set to +20 V as an intermediate value, for example.

While the switching transistor Tr1 is normally performing the switching operation, the polarity of the comparison circuit reverses at least within the fixed period T of 800 nS. Meanwhile, when the pulse width modulation circuit PWM or the like of the drive circuit 3 suffers a breakdown for some reason and the drive signal output to the gate of the switching transistor Tr1 becomes constant in potential, the switching transistor Tr1 operates abnormally in the active state. Since the direct-current input voltage Vi is almost uniform in potential, the voltage Vd at the connection point A also becomes almost uniform in potential, and the polarity of the output of the comparison circuit does not reverse within the fixed period T. Accordingly, when the polarity of the output of the comparison circuit does not reverse even once within the detection period Td set to be 2 μsec longer than the fixed period T of the drive signal, the abnormality determination circuit 4 determines the switching transistor Tr1 as being abnormally operating in the active state, turns the general L level of the output into the H level, and provides the output to the set input of the RS flip-flop circuit 5.

After the input of the L-level reset signal, the RS flip-flop circuit 5 outputs the L-level output signal to the gate of the switching transistor Tr2, brings the switching transistor Tr2 under the on-control, and causes the switching transistor Tr1 to continue the normal switching operation until the abnormality determination circuit 4 inputs the H-level set signal. Meanwhile, when the abnormality determination circuit 4 inputs the H-level set signal, the RS flip-flop circuit 5 outputs the H-level output signal to the gate of the switching transistor Tr2 and brings the switching transistor Tr2 under the off-control until the L-level reset signal is input again. As a result, the current flowing from the direct-current input power supply 10 to the switching transistor Tr1 is shut off to stop the heat generation of the switching transistor Tr1 operating in the active state.

When the cause of the breakdown that brought the switching transistor Tr1 into the active state was solved and the switching transistor Tr1 becomes capable of performing the switching operation, the L-level reset signal is input to the RS flip-flop circuit 5 to bring the switching transistor Tr2 under the on-control for recovery to normal operation.

Figure 3:
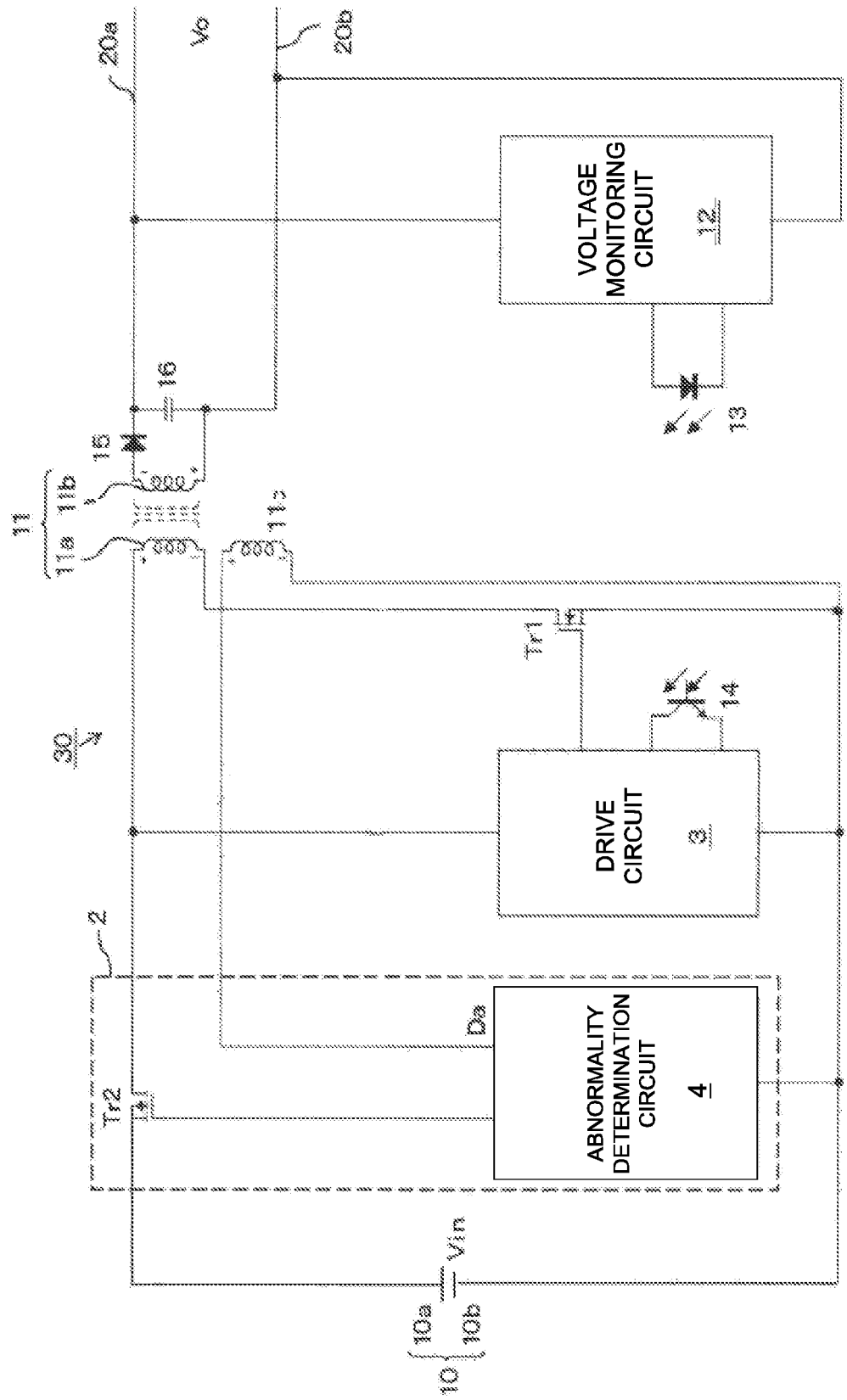
FIG. 3 is a circuit diagram of a DC-DC converter 30 according to another embodiment of the present invention.

In the foregoing embodiment, the voltage Vd at the connection point A on one side of the primary winding 11a where the voltage varies by the switching operation of the switching transistor Tr1 is compared to the threshold voltage Vth. Alternatively, when the transformer 11 has a sub winding, the voltage Vd at the other end of the sub winding not connected to the direct-current input power supply 10 may be compared to the threshold voltage Vth to determine the abnormal active-state operation of the switching transistor Tr1. FIG. 3 is a circuit diagram of a DC-DC converter 30 according to another embodiment of the present invention in which the transformer 11 has a primary sub winding 11c. One end of the primary sub winding 11c is connected to the low-voltage terminal 10b of the direct-current input power supply 10, and the other end of the same is connected to the detection terminal Da of the abnormality determination circuit 4. Other components are the same as those of the DC-DC converter 1 and will be given the same numbers as those of the DC-DC converter 1, and descriptions thereof will be omitted.

The voltage appearing at the other end of the primary sub winding 11c varies in proportion to variations in the voltage of the primary winding 11a. Accordingly, the abnormality determination circuit 4 can determine abnormality by comparing the potential at the other end of the primary sub winding 11c to the threshold voltage Vth as in the example described above. In this case, the threshold voltage Vth is arbitrarily set depending on the winding ratio between the primary winding 11a and the primary sub winding 11c within the variation range of the ratio. The winding phase of the primary sub winding 11c relative to the primary winding 11a may be either one because it is only required that the presence or absence of the reverse of the potential of the primary sub winding 11c can be detected by the winding phase. The one end of the primary sub winding 11c may be connected to the high-voltage terminal 10a instead of the low-voltage terminal 10b.

The foregoing embodiment is a flyback converter. However, the present invention is also applicable to other insulated DC-DC converters such as a self-excited flyback converter, a forward converter, a push-pull converter, and a full-bridge converter.

In the foregoing embodiment, the switching transistors Tr1 and Tr2 are P-channel FET and N-channel FET. Alternatively, the switching transistors Tr1 and Tr2 may be N-channel FET and P-channel FET with reversed drain-source connection, or may be bipolar transistors. In addition, the emergency stop switch is not limited to a transistor as far as, when the abnormality determination circuit 4 determines the active-state operation of the switching transistor Tr1, the emergency stop switch can shut off the current flowing from the direct-current input power supply 10 to the switching transistor Tr1.

When determining the active-state operation of the switching transistor Tr1, the abnormality determination circuit 4 may activate an alarm means not illustrated to inform the user of the abnormal operation state by an alarm sound or an alarm indication, in conjunction with or separately from the open control of the emergency stop switch.

In the foregoing embodiment, the switching transistor Tr1 operates in the active state due to abnormality in the drive signal. However, the present invention is also applicable to the cases where the switching transistor Tr1 operates in the active state by other causes such as the breakdown of the switching transistor Tr1 and the connection failure between the circuit elements.

INDUSTRIAL APPLICABILITY

The present invention is suitable to insulated DC-DC converters with transistors as switching elements.

DESCRIPTION OF REFERENCE SIGNS

1 DC-DC converter
2 Protection circuit
3 Drive circuit
4 Abnormality determination circuit
10 Direct-current input power supply
11 Transformer
11a Primary winding
11b Secondary output winding
11c Primary sub winding
12 Voltage monitoring circuit (constant-voltage control circuit)
20a High-voltage output line
20b Low-voltage output line
30 DC-DC converter
Vi Input voltage
Vo Output voltage
Tr1 Switching transistor
Tr2 Switching transistor (emergency stop switch)
Td Detection time
T Period of drive signal

The invention claimed is:
1. A DC-DC converter comprising:
a transformer that has a primary winding and a secondary output winding;
a switching transistor that is connected in series between a low-voltage terminal of a direct-current power supply exciting the primary winding and the primary winding;
a drive circuit that outputs to a control terminal of the switching transistor a drive signal for bringing the switching transistor under open or close control in a predetermined period; and
a constant-voltage control circuit that controls the close time of the switching transistor by the drive signal in accordance with an output voltage between a pair of high-voltage output line and low-voltage output line on the secondary side of the transformer to bring the output voltage under constant-voltage control, wherein the DC-DC converter includes:
a comparison circuit that compares a voltage at a connection point on the side of connection with the primary winding of the switching transistor to a threshold voltage arbitrarily set within a variation range of the voltage at the connection point while the switching transistor is performing a switching operation; and
an abnormality determination circuit that, when a polarity obtained by comparing the voltage to the threshold voltage does not change at least within the predetermined period in which the switching transistor is brought under open or close control, determines, asynchronously with the drive signal output from the drive circuit, that the switching transistor is operating in an active state.

2. The DC-DC converter according to claim 1, comprising a protection circuit that, when the abnormality determination circuit determines the active-state operation of the switching transistor, brings under open control an emergency stop switch connected between the direct-current input power supply and the primary winding.

3. A DC-DC converter comprising:
a transformer that has a primary winding, a primary sub winding, and a secondary output winding;
a switching transistor that is connected in series between a low-voltage terminal of a direct-current power supply exciting the primary winding and the primary winding;
a drive circuit that outputs to a control terminal of the switching transistor a drive signal for bringing the switching transistor under open or close control in a predetermined period; and
a constant-voltage control circuit that controls the close time of the switching transistor by the drive signal in accordance with an output voltage between a pair of high-voltage output line and low-voltage output line on the secondary side of the transformer to bring the output voltage under constant-voltage control, wherein one end of the primary sub winding is connected to the low-voltage terminal or the high-voltage terminal of the direct-current power supply, and
the DC-DC converter includes:
a comparison circuit that compares a voltage at the other end of the primary sub winding to a threshold voltage arbitrarily set within a variation range of the voltage while the switching transistor is performing a switching operation; and
an abnormality determination circuit that, when a polarity obtained by comparing the voltage to the threshold voltage does not change at least within the predetermined period in which the switching transistor is brought under open or close control, determines, asynchronously with the drive signal output from the drive circuit, that the switching transistor is operating in an active state.

\* \* \* \* \*